July 5, 1960 F. J. MACHOVEC 2,943,423
SHARPENER FOR ROTARY LAWN MOWER BLADE
Filed Feb. 7, 1958
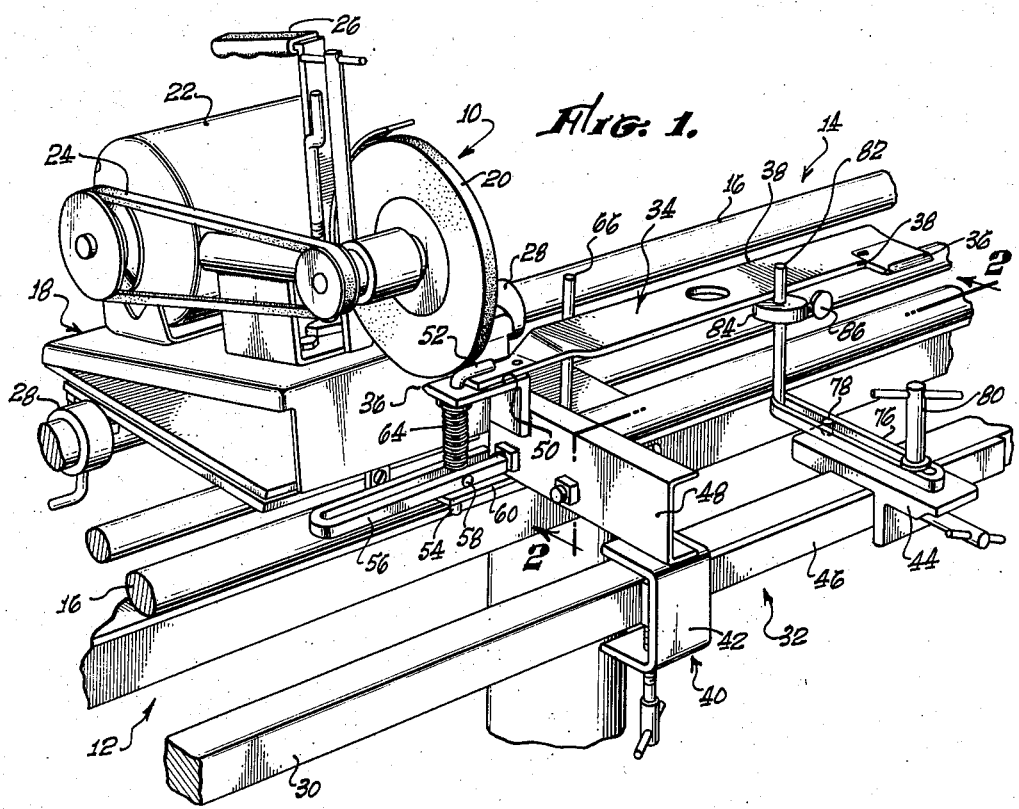
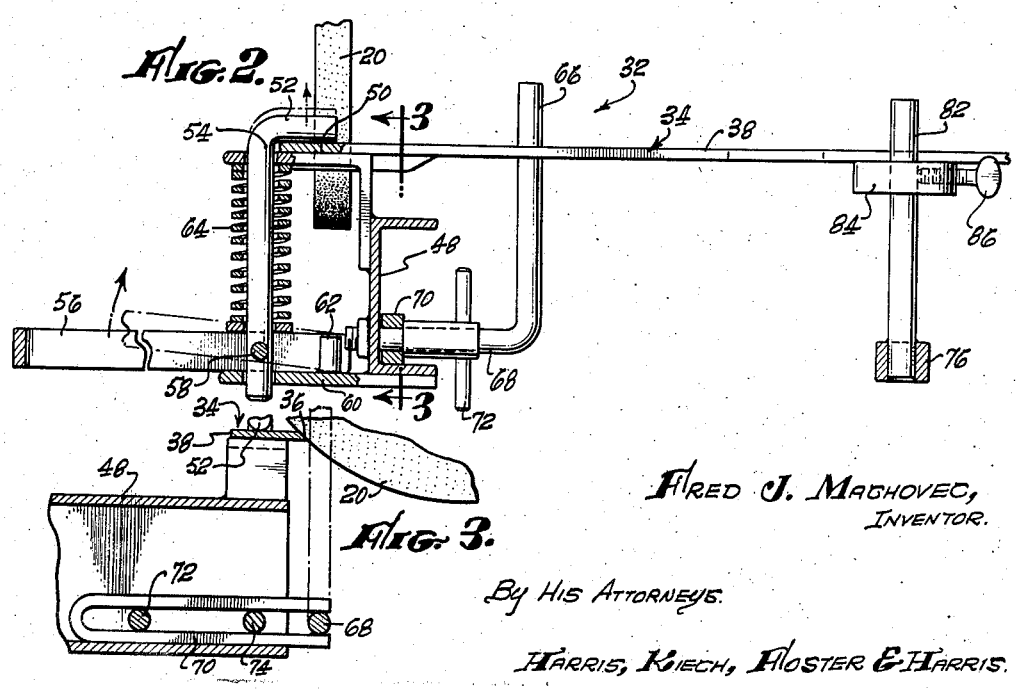
Fred J. Machovec,
INVENTOR.
By His Attorneys.
Harris, Kiech, Foster & Harris.

United States Patent Office 2,943,423
Patented July 5, 1960

2,943,423
SHARPENER FOR ROTARY LAWN MOWER BLADE
Fred J. Machovec, 160 N. Fair Oaks Ave., Pasadena, Calif.

Filed Feb. 7, 1958, Ser. No. 713,995

9 Claims. (Cl. 51—34)

The present invention relates in general to lawn mower sharpeners and, more particularly, to an apparatus for sharpening the blade or cutter of a rotary or propeller type lawn mower, the blade of such a lawn mower being rotatable about a vertical axis in a plane parallel to and close to ground level.

Still more particularly, the present invention relates to a sharpening apparatus having means for positioning a rotary lawn mower blade adjacent and parallel to the path of movement of means for grinding or otherwise sharpening the edges of the blade.

The blade positioning means is especially adapted for use with a lawn mower sharpener of the type disclosed in my Patent No. 2,466,905, issued April 12, 1949, although not limited thereto. The lawn mower sharpener of the patent mentioned includes a suitable supporting structure, generally horizontal track means carried by and extending longitudinally across the supporting structure, a carriage movable longitudinally of the supporting structure along the track means, and a grinding wheel mounted on the carriage and rotatable about an axis parallel to the track means. The blade positioning means of the rotary lawn mower sharpening apparatus of the present invention is adapted to be mounted on the supporting structure of the lawn mower sharpener of my prior patent to position the rotary lawn mower blade to be sharpened adjacent and parallel to the track means in a location such that the grinding wheel is engageable with an edge of the blade to sharpen same as the carriage moves along the track means.

A primary object of the invention is to provide a rotary lawn mower sharpener which includes means for quickly and easily positioning rotary lawn mower blades of various shapes and sizes adjacent and parallel to the track means in a location for engagement by the grinding wheel on the carriage.

More specifically, an important object of the invention is to provide a blade positioning means which includes a plurality of seats and locating elements engageable with the rotary lawn mower blade at spaced points such that they automatically orient the blade properly with respect to the path of movement of the grinding wheel, such seats and locating elements preferably being carried by a supporting means mountable on the supporting structure of the lawn mower sharpener of my prior patent.

Still more specifically, an object of the invention is to provide a blade positioning means which includes two seats engageable by one side of the rotary lawn mower blade and spaced apart longitudinally of the supporting means, i.e., in the direction of the path of movement of the grinding wheel, which includes two locating elements respectively engageable with opposite edges of the rotary lawn mower blade and spaced apart longitudinally and laterally of the supporting means, which includes a third locating element engageable with one end of the rotary lawn mower blade, and which includes means for holding the rotary lawn mower blade against one of the seats.

Another important object of the invention is to provide such a blade positioning means wherein various ones of the seats, locating elements and holding means are adjustable laterally, longitudinally and/or vertically relative to the supporting means to accommodate rotary lawn mower blades of various shapes and sizes.

Another object is to provide a blade positioning means of the foregoing nature wherein the seats, locating elements and holding means permit positioning of the rotary lawn mower blade in engagement therewith with either of the cutting edges of the blade presented to the grinding wheel. Thus, once the various elements of the blade positioning means have been adjusted to render one blade edge parallel to and engageable by the grinding wheel to sharpen same, the other edge may be presented to the grinding wheel in a position to be sharpened merely by disengaging the blade from the seats, locating elements and holding means, rotating it through 180° about its axis of rotation, and reengaging the blade with the seats, locating elements and holding means.

Another object is to provide a blade positioning means wherein one of the blade seats is carried by one of the locating elements and is adjustable vertically relative thereto.

A further object is to provide a blade positioning means wherein the holding means is carried by another of the locating elements and is engageable with the upper side of the blade to clamp the lower side thereof against the other blade seat.

The foregoing objects, advantages, features and results of the present invention, together with various other objects, advantages, features and results thereof which will be evident to those skilled in the lawn mower sharpening art in the light of the present disclosure, may be attained with the exemplary embodiment of the invention described in detail hereinafter and illustrated in the accompanying drawing, in which:

Fig. 1 is a fragmentary perspective view illustrating a rotary lawn mower sharpener of the invention which includes a rotary-blade positioning means of the invention mounted on a lawn mower sharpener of the type illustrated in my aforementioned prior patent;

Fig. 2 is an enlarged, fragmentary sectional view taken along the arrowed line 2—2 of Fig. 1; and Fig. 3 is a fragmentary sectional view taken along the arrowed line 3—3 of Fig. 2.

In the drawing and in the description which follows, only those portions of the structure of the lawn mower sharpener of my prior patent are disclosed which are necessary to an understanding of the present invention. Consequently, reference is hereby made to my prior patent for a complete disclosure of any portions of the lawn mower sharpener of the patent which are not specifically disclosed herein.

Referring particularly to Fig. 1 of the drawing, the lawn mower sharpener is designated generally by the numeral 10 and includes a supporting structure 12 carrying a track means 14 which extends horizontally and longitudinally across the supporting structure and which preferably comprises two substantially parallel tracks 16 in the form of cylindrical rods the axes of which are disposed in substantially the same horizontal plane. Movable along the tracks 14 of the lawn mower sharpener 10 is a carriage 18 on which is mounted a grinding wheel 20 driven by an electric motor 22 through a V-belt 24, the axis of rotation of the grinding wheel being parallel to the track means 14. The carriage 18 may be moved along the track means 14 manually by means of a handle 26, the travel of the carriage being limited by adjustable stops 28 which are shown as carried by one of the tracks 16, but which may be mounted on other components of the supporting structure 12.

Mounted adjacent the track means 14 on a square bar 30 which forms part of the supporting structure 12 is a means 32 for positioning a rotary lawn mower blade 34 adjacent and parallel to the track means in a location such that the grinding wheel is engageable with one or the other of end portions 36 of longitudinal edges 38 of the blade, whereby to sharpen one or the other of the edge portions 36. As is conventional in the sharpening of rotary lawn mower blades like the blade 34, only relatively short, diagonally opposite edge portions, corresponding to the edge portions 36, adjacent the ends of the blade are sharpened, the remaining portions of the longitudinal edges being unsharpened.

The blade positioning means 32 includes a supporting means 40 mounted on the bar 30 and comprising two clamps 42 and 44, similar to ordinary C-clamps, embracing and gripping the bar 30. To accommodate rotary lawn mower blades of different lengths, the clamps 42 and 44 may be set in different positions longitudinally of the bar 30, and thus in different positions longitudinally of the track means 14, the bar being parallel to the track means. The clamp 42 is provided with an arm or tongue 46 which lies flat against the bar 30 and which is adapted to be clamped thereto by the clamp 44, which serves to rigidly secure the clamp 42 to the bar 30 in a manner preventing tilting thereof.

Carried by the clamp 42 and extending laterally toward the track means 14 is a channel 48 provided at the end thereof nearest the track means with a first seat 50 engageable by the lower side of the blade 34 adjacent one end thereof. In the construction illustrated, the first seat 50 is simply an angle section welded to the channel or other supporting member 48.

The blade 34 is clamped against the first seat 50 by a holding means or holding element 52 engageable with the upper side of the blade at one end thereof. The holding element 52 is carried by a vertical rod which constitutes what will be referred to hereinafter as a third locating element 54 engageable by one end of the blade 34. The locating element 54 extends downwardly through and is vertically slidable relative to the first seat 50 and is pivotally connected at its lower end to a horseshoe-shaped lever 56 by means of a pivot 58, the lower end of the locating element 54 extending downwardly through and being vertically slidable relative to a lug 60 on the channel 48 so that the seat 50 and the lug 60 guide the locating element 54 along a vertical path. The lower end of the locating element 54 is embraced by the horseshoe-shaped lever 56, the latter also embracing a pin 62 on the lug 60 which is spaced from the locating element 54 to hold the lever in place while permitting upward and downward rocking thereof between the positions shown in broken and solid lines. A heavy compression spring 64 encircling the locating element and seated against the lower side of the seat 50 and against the upper side of the lever 56 biases the holding element 52 downwardly against the upper side of the blade 34 with considerable force to clamp the blade against the seat 50.

The positioning means 32 includes a locating element 66, hereinafter referred to as a first locating element, which is engageable with the edge 38 of the blade 34 nearest the track means 14 and which is spaced longitudinally from the first seat 50 and the third locating element 54. The first locating element 66 takes the form of a vertical rod having an offset lower end 68 rigidly connected to a slotted guide member 70 movable along the channel 48 in the fore-and-aft or lateral direction. A clamping screw 72 extends through the slot in the guide member 70 and is threaded into the channel 48 to lock the guide member relative to the channel with the first locating element 66 in any desired fore-and-aft or transverse position. This structure provides a means for adjusting the lateral position of the first locating element 66 to insure a parallel relationship between the edge 38 of the blade 34 to be sharpened and the track means 14. The clamping screw 72 and a guide pin 74 carried by the channel 48 and extending into the slot in the guide member 70 serve to limit movement of the guide member to movement in the fore-and-aft or lateral direction.

Slidable relative to the clamp 44 in the fore-and-aft or transverse direction is a guide member 76 having therein a slot which receives a guide pin 78 on the clamp 44 and a clamping screw 80 threaded into the clamp 44 and adapted to lock the guide member in any desired lateral position. Connected to the inner end of the guide member 76 is a vertical second locating element 82 spaced horizontally and longitudinally from and horizontally and laterally from the locating elements 54 and 66, the locating element 82 being engageable by the edge 38 of the blade 34 opposite the edge 38 thereof which is engageable with the first locating element 66. As will be apparent, the position of the second locating element 82 may be adjusted laterally by means of the clamping screw 80 to vary the lateral spacing between the locating elements 66 and 82, thereby insuring a parallel relationship between the track means 14 and the edge portion 36 to be sharpened, and accommodating rotary lawn mower blades of different widths. The second locating element 82 may also be moved longitudinally to vary the spacing between it and the first seat 50 and the locating elements 54 and 66 by moving the clamp 44 longitudinally of the bar 30, thereby accommodating different rotary lawn mower blade lengths. Alternatively, the clamp 42 and the elements carried thereby may be moved longitudinally relative to the clamp 44.

Vertically slidable on the second locating element 82 is a second seat 84 engageable by the lower side of the blade 34. In the construction shown, the second seat 84 has the form of a collar which may be locked in any desired vertical position by means of a set screw 86. As will be apparent, the vertical position of the second seat 84 may be adjusted to insure that the blade 34 is perfectly parallel to the track means 14 in the vertical direction.

Considering the over-all operation of the invention, the blade 34 is placed on the seats 50 and 84 between the first and second locating elements 66 and 82 with one end of the blade in engagement with the third locating element 54 and under the holding element 52, the latter being raised to admit the end of the blade by lifting the free end of the lever 56. The seats 50 and 84 may be regarded as forming a seat means from which the locating elements 54, 66 and 82 project. The positions of the locating elements 66 and 82 are then adjusted in the transverse direction, i.e., transversely of the track means 14, to establish a parallel relationship between the edge portion 36 to be sharpened and the track means in a horizontal direction. A parallel relation in the vertical direction is established by adjusting the vertical position of the seat 84. If necessary to accommodate a blade of a particular length, the spacing between the clamps 42 and 44 in the longitudinal direction may be varied to increase or decrease the spacing between the seat 50 and the locating elements 54 and 66 on the one hand and the seat 84 and the locating element 82 on the other.

Once the edge portion 36 to be sharpened has been rendered parallel to the track means 14 both horizontally and vertically in the foregoing manner, the carriage 18 is moved along the track means 14 between the stops 28 to grind such edge portion. If more than one pass is necessary, the grinding wheel 20 may be moved toward the blade after the first pass in the manner disclosed in my aforementioned patent.

After one edge portion 36 of the blade 34 has been sharpened in the foregoing manner, the free end of the lever 56 is lifted to release the blade, whereupon the blade may be lifted upwardly clear of the positioning means 32, rotated through an angle of 180° about a vertical axis, and reinstalled in engagement with the seats 50 and 84 and the locating elements 54, 66 and 82. This presents the other edge portion 36 to the grinding wheel, it being unnecessary to change any of the adjustments of the positioning elements previously made as long as the blade 34 is symmetrical, which is the conventional situation.

Thus, the present invention provides means whereby both cutting edges of a rotary lawn mower blade may be sharpened quickly, easily and accurately. Although an exemplary embodiment of the invention has been disclosed herein for purposes of illustration, it will be understood that various changes, modifications and substitutions may be incorporated in such embodiment without departing from the spirit of the invention as defined by the claims which follow.

I claim as my invention:

1. In an apparatus for sharpening a rotary lawn mower blade, the combination of: supporting structure; track means carried by and extending longitudinally across said supporting structure; a carriage movable along said track means; a grinding wheel mounted on said carriage; a first seat engageable by said blade and carried by said supporting structure; a second seat engageable by said blade and carried by said supporting structure and spaced from said first seat longitudinally of said supporting structure; a first locating element carried by said supporting structure and engageable by one edge of said blade; a second locating element carried by said supporting structure and engageable by the other edge of said blade; and a third locating element carried by said supporting structure and engageable by one end of said blade.

2. In combination with a lawn mower sharpener which includes a supporting structure, horizontal track means carried by and extending longitudinally across said supporting structure, a carriage movable along said track means, and a grinding wheel mounted on said carriage and rotatable about an axis parallel to said track means, means for positioning a rotary lawn mower blade to be sharpened adjacent and parallel to said track means in a location such that said grinding wheel is engageable with an edge of said blade to sharpen same as said carriage moves along said track means, including: a first seat engageable by said blade and carried by said supporting structure; a second seat engageable by said blade and carried by said supporting structure and spaced from said first seat longitudinally of said supporting structure; a first locating element carried by said supporting structure and engageable by one edge of said blade; a second locating element carried by said supporting structure and engageable by the other edge of said blade and spaced from said first locating element transversely of said supporting structure; and a third locating element engageable by one end of said blade and carried by said supporting structure.

3. In an apparatus for positioning a rotary lawn mower blade adjacent and parallel to the path of movement of a movable sharpening means, the combination of: supporting means; a first seat engageable by one side of said blade and carried by said supporting means; a second seat engageable by said side of said blade and carried by said supporting means and spaced from said first seat longitudinally of said supporting means; a first locating element carried by said supporting means and engageable by one edge of said blade; a second locating element carried by said supporting means and engageable by the other edge of said blade and spaced from said first locating element longitudinally and laterally of said supporting means; and a third locating element carried by said supporting means and engageable by an end of said blade.

4. In an apparatus for positioning a rotary lawn mower blade adjacent and parallel to the path of movement of a movable sharpening means, the combination of: supporting means; a first seat engageable by one side of said blade and carried by said supporting means; a second seat engageable by said side of said blade and carried by said supporting means and spaced from said first seat longitudinally of said supporting means; a first locating element carried by said supporting means and engageable by one edge of said blade; a second locating element carried by said supporting means and engageable by the other edge of said blade and spaced from said first locating element longitudinally and laterally of said supporting means; a third locating element carried by said supporting means and engageable by an end of said blade; and means for holding said blade on said first seat.

5. In an apparatus for positioning a rotary lawn mower blade adjacent and parallel to the path of movement of a movable sharpening means, the combination of: supporting means; a first seat engageable by one side of said blade and carried by said supporting means; a second seat engageable by said side of said blade and carried by said supporting means and spaced horizontally and longitudinally of said supporting means from said first seat; means for adjusting the position of said second seat vertically relative to said supporting means; a first locating element carried by said supporting means and engageable by one edge of said blade; a second locating element carried by said supporting means and engageable by the other edge of said blade, said second locating element being spaced horizontally and longitudinally and horizontally and laterally of said supporting means from said first locating element; means for adjusting the position of at least one of said first and second locating elements horizontally and laterally of said supporting means; a third locating element carried by said supporting means and engageable by an end of said blade; and means engageable with the other side of said blade for holding said one side thereof against said first seat.

6. In an apparatus for positioning a rotary lawn mower blade adjacent and parallel to the path of movement of a movable sharpening means, the combination of: supporting means; a first seat engageable by one side of said blade and carried by said supporting means; a first locating element carried by said supporting means and engageable by one edge of said blade; a second locating element carried by said supporting means and engageable by the other edge of said blade, said second locating element being spaced horizontally and longitudinally of said supporting means from said first seat and being spaced horizontally and laterally and horizontally and longitudinally of said supporting means from said first locating element; a second seat engageable by said one side of said blade and carried by and movable vertically relative to said second locating element; means for locking said second seat relative to said second locating element in any desired vertical position; a third locating element carried by said supporting means and spaced horizontally and longitudinally of said supporting means from said first and second locating elements and engageable by one end of said blade; and means engageable with the other side of said blade for holding said one side thereof against said first seat.

7. In an apparatus for positioning a rotary lawn mower blade adjacent and parallel to the path of movement of a movable sharpening means, the combination of: supporting means; a first seat engageable by one side of said blade and carried by said supporting means; a first locating element carried by said supporting means and engageable by one edge of said blade; a second locating element carried by said supporting means and engageable by the other edge of said blade, said second locating element being spaced horizontally and longitudinally of said supporting means from said first seat and being spaced horizontally and laterally and horizontally and longitudinally of said supporting means from said first locating element; a second seat engageable by said one side of said blade and carried by and movable vertically relative to said second locating element; means for locking said second seat relative to said second locating element in any desired vertical position; a third locating element carried by said supporting means and spaced horizontally and longitudinally of said supporting means from said first and second locating elements and engageable by one end of said blade, said third locating element being adjacent said first seat; and means carried by said third locating element and engageable with the other side of said blade for clamping said one side of said blade against said first seat.

8. An apparatus as defined in claim 7 including means for adjusting the position of at least one of said first and second locating elements relative to said supporting means horizontally and laterally of said supporting means.

9. An apparatus as set forth in claim 8 including means for adjusting the positions of said second locating element and said second seat relative to said supporting means horizontally and longitudinally of said supporting means, whereby to move said second locating element and said second seat horizontally and longitudinally of said supporting means closer to, or farther away from, said first seat, said first locating element and said third locating element.

References Cited in the file of this patent

UNITED STATES PATENTS

| | | |
|---|---|---|
| 2,069,097 | Root | Jan. 26, 1937 |
| 2,142,105 | Blankner | Jan. 3, 1939 |
| 2,353,096 | Weidnauer | July 4, 1944 |

FOREIGN PATENTS

| | | |
|---|---|---|
| 156,409 | Australia | May 10, 1954 |